United States Patent
Chao et al.

(10) Patent No.: US 9,683,850 B2
(45) Date of Patent: Jun. 20, 2017

(54) METHOD FOR NAVIGATION USING ADAPTIVE COVERAGE

(75) Inventors: Yi-Chung Chao, San Jose, CA (US); Robert W. Rennard, Gilroy, CA (US); Zhiqi Luo, Los Altos, CA (US); Musiri S. Shrivathsan, Sunnyvale, CA (US)

(73) Assignee: Telenav, Inc., Santa Clara, CA (US)

(*) Notice: Subject to any disclaimer, the term of this patent is extended or adjusted under 35 U.S.C. 154(b) by 792 days.

(21) Appl. No.: 12/365,128

(22) Filed: Feb. 3, 2009

(65) Prior Publication Data

US 2010/0198494 A1    Aug. 5, 2010

(51) Int. Cl.
  *G06Q 30/00*  (2012.01)
  *G01C 21/20*  (2006.01)
  *G01C 21/34*  (2006.01)
  *G01C 21/32*  (2006.01)

(52) U.S. Cl.
  CPC ............ *G01C 21/20* (2013.01); *G01C 21/32* (2013.01); *G01C 21/34* (2013.01)

(58) Field of Classification Search
  CPC ...... G01C 21/005; G01C 21/26; G01C 21/28; G01C 21/34
  See application file for complete search history.

(56) References Cited

U.S. PATENT DOCUMENTS

| | | | |
|---|---|---|---|
| 5,422,813 A | 6/1995 | Schuchman et al. | |
| 5,726,660 A | 3/1998 | Purdy et al. | |
| 6,600,444 B2 | 7/2003 | Desjardins | |
| 2002/0087655 A1 | 7/2002 | Bridgman et al. | |
| 2002/0169549 A1* | 11/2002 | Kaplan | G01C 21/3626 701/442 |
| 2006/0244587 A1 | 11/2006 | Humphries et al. | |
| 2007/0112504 A1* | 5/2007 | Krause | G01C 21/3407 701/532 |
| 2009/0070031 A1* | 3/2009 | Ginsberg | 701/208 |
| 2010/0318288 A1* | 12/2010 | Korn et al. | 701/201 |

FOREIGN PATENT DOCUMENTS

| | | |
|---|---|---|
| CN | 101026550 A | 8/2007 |
| WO | 2008083986 A1 | 7/2008 |

OTHER PUBLICATIONS

May 2009—http://www.englishforum.ch/transportation-driving/51681-gps-tunnels.html.*
Colleen Serafin, Marie Williams, Gretchen Paelke, and Paul Green, Functions and Features of Future Driver Information Systems. Published as Technical Report UMTRI-91-16, May 1991 (Revised Nov. 1993). Retrieved on Mar. 8, 2010 from the internet at http://www.umich.edu/~driving/publications/UMTRI-91-16.pdf.

* cited by examiner

*Primary Examiner* — Matthew Zimmerman
(74) *Attorney, Agent, or Firm* — IP Investment Law Group

(57) ABSTRACT

A method of operation of a navigation system having adaptive coverage includes: detecting a no service region or an intermittent loss of service region upcoming in a route; selecting an adaptive coverage operations block based on the no service region or based on the intermittent loss of service region for storing on a device; and sending data from the adaptive coverage operations block for displaying on the device.

20 Claims, 9 Drawing Sheets

METHOD FOR NAVIGATION USING ADAPTIVE COVERAGE

TECHNICAL FIELD

The present invention relates generally to a navigation system, and more particularly to a navigation system having adaptive coverage.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality. Some of the research and development strategies focus on new technologies while others focus on improving the existing and mature technologies. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, a personal digital assistant (PDA), or a portable navigation device (PND).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

Thus, a need still remains for a navigation system having adaptive coverage providing low cost, improved functionality, and improved reliability. In view of the ever-increasing need to save costs and improve efficiencies, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system having adaptive coverage including: detecting a no service region or an intermittent loss of service region upcoming in a route; selecting an adaptive coverage operations block based on the no service region or based on the intermittent loss of service region for storing on a device; and sending data from the adaptive coverage operations block for displaying on the device.

The present invention provides a navigation system having adaptive coverage including: a communication unit for detecting a no service region or an intermittent loss of service region upcoming in a route; and a control unit, coupled to the communication unit, for selecting an adaptive coverage operations block based on the no service region or based on the intermittent loss of service region for storing on a device, and sending data from the adaptive coverage operations block with the communication unit for displaying on the device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
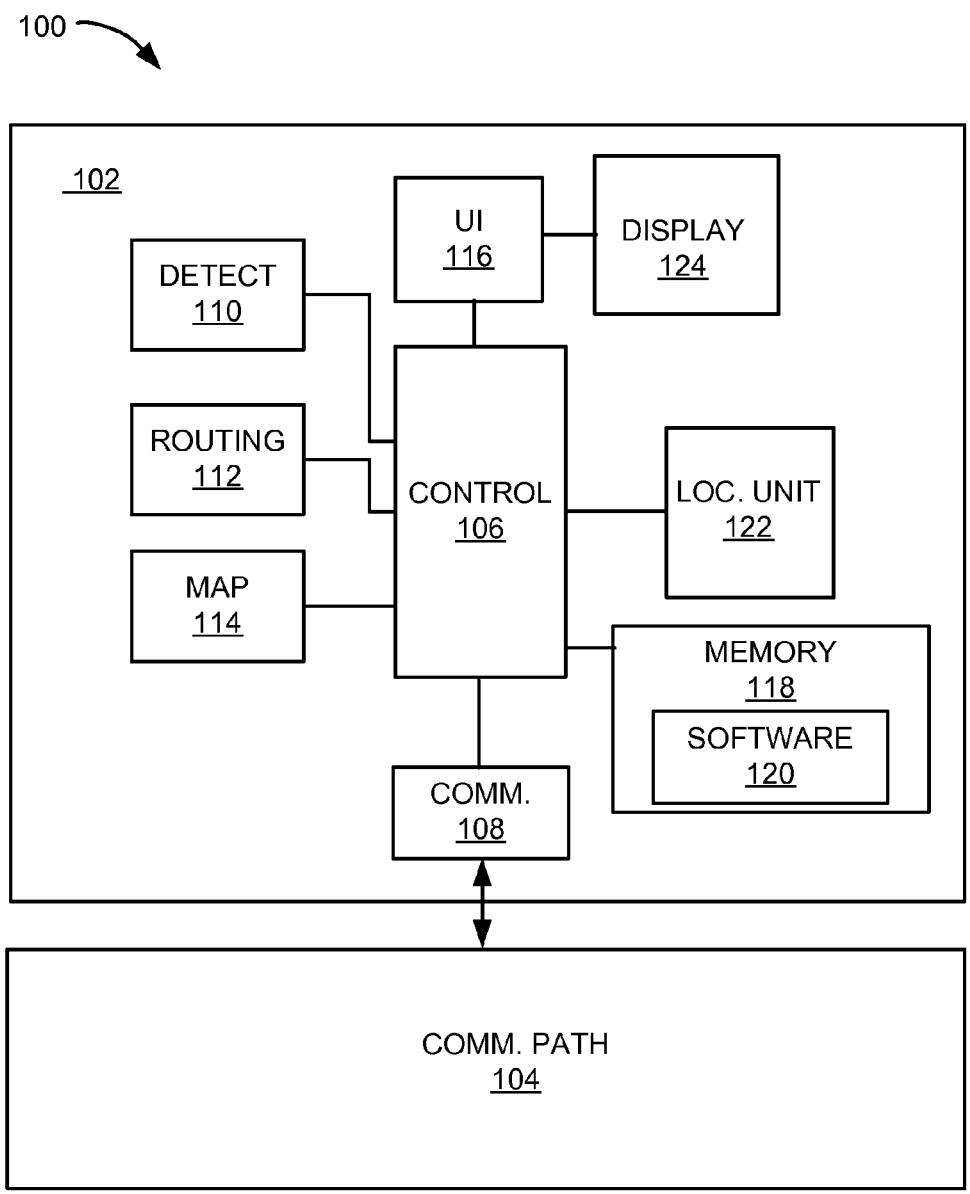
FIG. 1 is a block diagram of a navigation system having adaptive coverage in a first device embodiment.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS.

One skilled in the art would appreciate that the format with which a navigation system is expressed is not critical to some embodiments of the invention. For example, in some embodiments, navigation information is presented in the format of (x, y), where x and y are two ordinates that define the geographic location, i.e., a position of a user. In an alternative embodiment, navigation information is presented by longitude and latitude related information. In a further embodiment of the present invention, the navigation information also includes a velocity element comprising a speed component and a heading component.

The term "relevant information" referred to herein includes the navigation information described as well as information relating to points of interest (POIs) to the user, such as local businesses, hours of businesses, types of businesses, advertised specials, traffic information, maps, local events, and nearby community or personal information.

Referring now to FIG. 1, therein is shown a block diagram of a navigation system 100 having adaptive coverage in a first device embodiment. The navigation system 100 can include a device 102 that can link to a communication path 104. The navigation system 100 can mutate and adapt to conditions based on predetermined criteria. For example, the navigation system 100 can detect predetermined criteria or predetermined upcoming criteria, such as an outage region, an outage condition, a capability of a target device, or a combination thereof. The functionality of the system can be modified based on that detection of the predetermined criteria. The criteria can also include speed, time, distance, and location of the system.

The device 102 can access the communication path 104 for location services, such as global positioning service (GPS). The device 102 can be any of a variety of centralized or decentralized computing devices or any of a variety of mobile devices. For example, the device 102 can be a computer, a computer in a grid computing pool, a virtualized computer, a computer in a cloud computing pool, or a computer in a distributed computing topology. The device 102 can include routing functions or switching functions for coupling with the communication path 104.

As another example, the device 102 can be a cellular phone, personal digital assistant, a notebook computer, or other multi-functional mobile communication or entertainment devices having means for coupling to the communication path 104.

The communication path 104 can be a variety of networks. For example, the communication path 104 can include wireless communication, wired communication, optical, ultrasonic, or the combination thereof. Satellite communication, cellular communication, Radio Data System (RDS) High Definition (HD) radio data, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

The device 102 can include a number of functional units. For example, the device 102 can include a control unit 106 such as a processor or computer, a communication unit 108, a detect-type engine 110, a routing engine 112, a mapping engine 114, a user interface 116, a memory 118, a software 120, a location unit 122, and a multimedia display interface 124.

The control unit 106 can be coupled to the communication unit 108, the detect-type engine 110, the routing engine 112, the mapping engine 114, the user interface 116, the memory 118, and the location unit 122. The memory 118 can include the software 120. The user interface 116 is linked to the multimedia display interface 124. The user interface 116 and the multimedia display interface 124 can include a display, a projector, a key pad, a touchpad, soft-keys, a keyboard, a microphone, a speaker, or any combination thereof to provide data and command inputs for the navigation system 100.

For illustrative purposes, the navigation system 100 is described with discrete functional blocks, although it is understood that the navigation system 100 can have a different configuration. For example, the control unit 106, the communication unit 108, the detect-type engine 110, the routing engine 112, and the mapping engine 114 may not be discrete functional blocks but may have one or more of the aforementioned blocks combined into one functional block.

The control unit 106 can execute the software 120 and can provide the intelligence of the device 102. The control unit 106 can interact with the detect-type engine 110, the routing engine 112, the mapping engine 114, the communication path 104 via the communication unit 108, and the user interface 116.

The detect-type engine 110 can detect the functional capabilities and the storage capacity in the device 102. The routing engine 112 can compute routing instructions to a location. The mapping engine 114 can provide mapping and graphical display information for a location. A user can provide an input to the device 102 through the user interface 116.

The location unit 122 can provide location information and can be implemented in many ways. For example, the location unit 122 can be a global positioning system (GPS), inertial navigation system, cell-tower location system, accelerometer location system, WiFi sign post location, or any combination thereof. The location unit 122 can include the active and passive components, such as microelectronics or an antenna, for interaction with the communication path 104.

The memory 118, such as a volatile memory, a nonvolatile memory, an internal memory, an external memory, or a combination thereof, can store the software 120, setup data, multimedia data, photos, text, sounds recordings, video, and other data for the operation of the navigation device. The memory 118 can also store the relevant information, such as maps, sub-optimal maps, route information, sub-optimal route information, traffic information, advertisement and point of interest (POI), navigation routing entries, driver profiles, or any combination thereof. The term sub-optimal refers to information that is not the full-detailed information but some subset that is scaled or sized for the available capacity of the memory 118. The memory 118 can also store recorded, imaged, sampled or created relevant information to be transmitted to the device 102.

The memory 118 can be implemented in a number of ways. For example, the memory 118 can be a nonvolatile storage such as non-volatile random access memory (NVRAM), Flash memory, or disk storage or a volatile storage such as static random access memory (SRAM).

The communication unit 108 can connect with the communication path 104 and can include active and passive components, such as microelectronics or an antenna, for interaction to the telecommunication system of the communication path 104.

Figure 2:
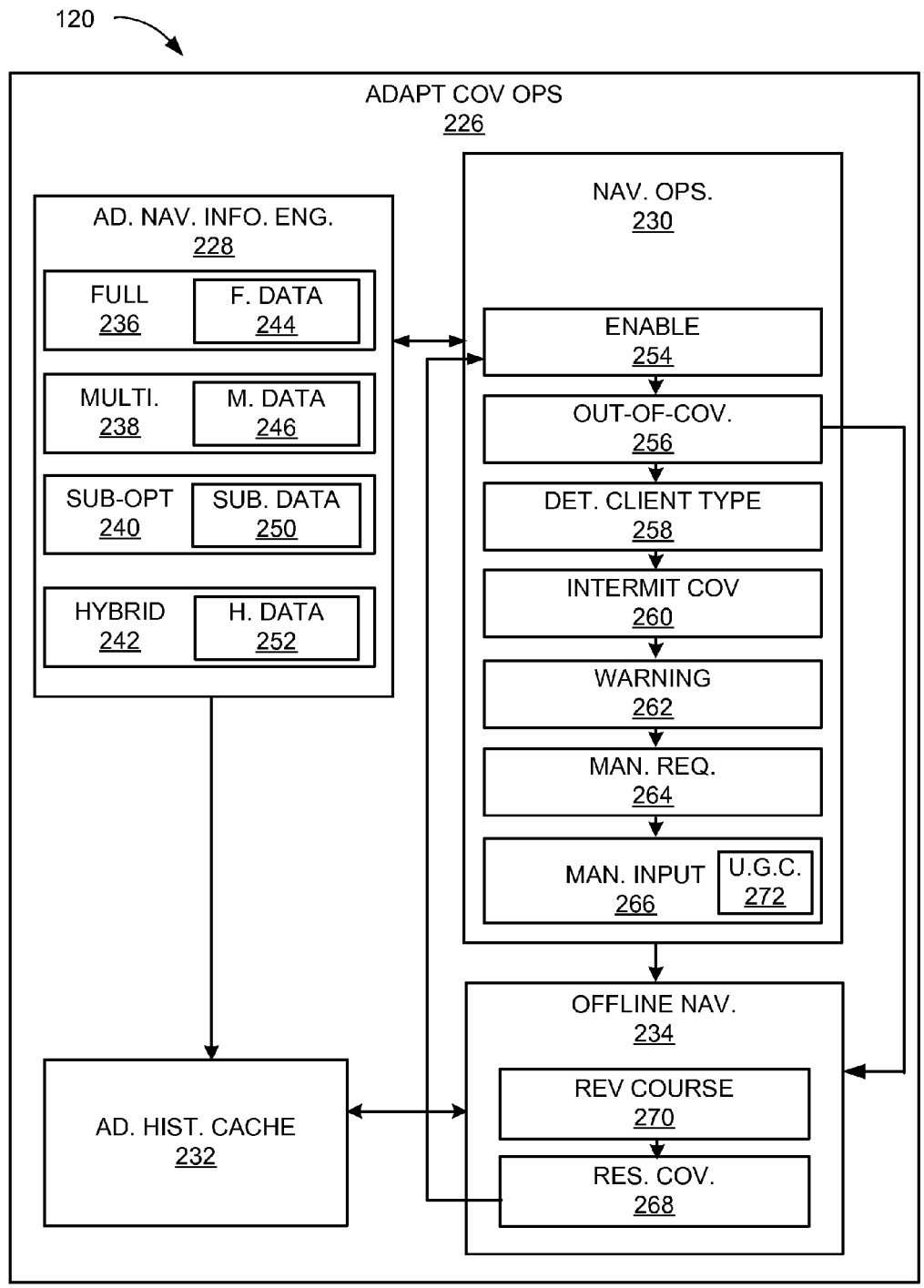
FIG. 2 is a flow chart of operation of the navigation system of FIG. 1.

Referring now to FIG. 2, therein is shown a flow chart of operation of the navigation system 100 of FIG. 1. The flow chart can be executed on the device 102 of FIG. 1. For example, the control unit 106 of FIG. 1 can execute the flow chart. The flow chart represents an adaptive coverage operations block 226 included in the software 120.

The adaptive coverage operations block 226 can include an adaptive navigation information engine 228, a navigation operations block 230, an adaptive history cache block 232, and an offline navigation block 234. The adaptive navigation information engine 228 is linked to the navigation operations block 230 and the adaptive history cache block 232. The navigation operations block 230 is linked to the offline navigation block 234. The offline navigation block is linked to the adaptive history cache block 232.

The adaptive navigation information engine 228 can include a full-detailed navigation block 236, a multiple-route block 238, a sub-optimal navigation block 240, and a hybrid navigation block 242. For illustrative purposes, the navigation system 100 is shown having discrete blocks, although it is understood that the navigation system 100 can include other blocks or blocks in different configurations.

For example, the adaptive navigation information engine 228 can include the full-detailed navigation block 236, the multiple-route block 238, the sub-optimal navigation block 240, and the hybrid navigation block 242 in a different arrangement. The full-detailed navigation block 236, the multiple-route block 238, the sub-optimal navigation block 240, and the hybrid navigation block 242 can utilize the same or portion of the same information, can be organized into a single block, can be partitioned to smaller granularities, can be interconnected, or a combination thereof.

As another example, the navigation system 100 can have only the full-detailed navigation block 236, the sub-optimal navigation block 240, the hybrid navigation block 242, or the multiple-route block 238. The available memory size of the memory 118 of FIG. 1 can determine which of the aforementioned block can be stored on the device 102.

The adaptive navigation information engine 228 can compile the navigation information into data and can send these data to the navigation operations block 230 and the adaptive history cache block 232. The data of the adaptive navigation information engine 228 will be explained in detail below.

The full-detailed navigation block 236 of the adaptive navigation information engine 228 can include a database of full maps, and can include full detailed relevant information including points of interests, landmarks, restaurants, gas stations, advertisements, coupons, and shopping centers. The full-detailed navigation block 236 can create full-detailed routing instructions including the data needed for audio prompts and turn-by-turn graphical instructions. The full-detailed navigation block 236 can compile the full-detailed navigation information into a full-detailed data 244. The full-detailed data 244 can be sent to the navigation operations block 230 and the adaptive history cache block 232 for navigation.

The multiple-route block 238 of the adaptive navigation information engine 228 can calculate multiple routes based on the end destination of the device 102. For example, the multiple-route block 238 can include routes that take the shortest route, avoid freeways, avoid local routes, and create routes that take into account detours by the device 102. The multiple-route block 238 can compile the multiple-route information into a multiple-route data 246. The multiple-route data 246 can be sent to the navigation operations block 230 for navigation.

The sub-optimal navigation block 240 of the adaptive navigation information engine 228 can generate a sub-optimal navigation data 250. The sub-optimal navigation data 250 can include non-full detailed versions of the information available from the full-detailed navigation block 236. For example, the sub-optimal navigation block 240 can generate sub-optimal maps, sub-optimal routing instructions, sub-optimal audio prompts, and a sub-optimal list of POIs. The sub-optimal navigation data 250 can take up a minimum amount, an available amount, or the allocated amount of the memory 118. The sub-optimal navigation block 240 can adapt the type and complexity of the sub-optimal navigation data 250 to adjust to the type and limitations of the memory 118.

For example, the sub-optimal navigation block 240 can create sub-optimal maps, sub-optimal routing instructions or any combination thereof with low utilization requirement of the memory 118. The sub-optimal maps can include basic maps of major freeways and city locations without detailed street-by-street routing information. The sub-optimal routing instructions can include turn-by-turn routing instructions in text format instead of the full graphical or multimedia presentation of the turn-by-turn routing instructions.

The hybrid navigation block 242 can create hybrid maps, hybrid routing instructions, or any combination thereof using information from the full-detailed navigation block 236 and the sub-optimal navigation block 240. A hybrid map, for example, can include full-details of a region of a city with less detailed map information, such as sub-optimal information, surrounding the full-detailed region.

Hybrid routing instructions can include some audio route instructions and more detailed text instructions or any combination of the two. The full-detailed portion within the hybrid maps and the hybrid routing instructions can be adapted to limitations of the memory 118. Full-detailed and non-full detailed information, such as the sub-optimal information, in the hybrid maps and the hybrid routing instructions can be selectable, set automatically, or manually selected. The hybrid navigation block 242 can compile the hybrid navigation information into a hybrid data 252. The hybrid data 252 can include portions that are full-detailed and other portions that are sub-optimal depending the capacity, availability, or allocation of the memory 118. The hybrid data 252 can be sent to the navigation operations block 230 for navigation.

The navigation operations block 230 can include an enable block 254, an out-of-coverage detection block 256, a detect client type block 258, an intermittent coverage block 260, a warning block 262, a manual request block 264, and a manual input block 266. The manual input block 266 can include a user generated content 272. For illustrative purposes, the navigation system 100 is shown with the navigation operations block 230 having discrete blocks, although it is understood that the navigation system 100 can include the navigation operations block 230 with a different partition of blocks.

For example, the enable block 254, the out-of-coverage detection block 256, the detect client type block 258, the intermittent coverage block 260, the warning block 262, the manual request block 264, and the manual input block 266 can be included into overlapping blocks or in the same block. As another example, the enable block 254, the out-of-coverage detection block 256, the detect client type block 258, the intermittent coverage block 260, the warning block 262, the manual request block 264, and the manual input block 266 can be interconnected.

The navigation operations block 230 can provide the navigation operations for the device 102. While performing navigation operations, the navigation operations block 230 can access navigation information from the adaptive navigation information engine 228.

The navigation operations block 230 can operate the enable block 254. The enable block 254 of the navigation operations block 230 can determine the features available to or within the device 102 and can enable a predetermined set of the features. For example, the device 102 can be enabled based on the terms in the service agreement or the capability of the device 102.

From the enable block 254, the out-of-coverage detection block 256 can detect if the device 102 has a stable connection to the network and to the communication path 104 of FIG. 1 for GPS fixes. If the out-of-coverage detection block 256 detects only GPS connection with the communication path 104, the out-of-coverage detection block 256 will enable the offline navigation block 234. If the out-of-coverage detection block 256 detects a full connection with the communication path 104, the out-of-coverage detection block 256 can request the full-detailed data 244 from the full-detailed navigation block 236 or the information storable on the memory 118 through the communication path 104. The full connection is defined as the device 102 having connection to the network for the full-detailed data 244 as well as GPS connection.

The out-of-coverage detection block 256 can also detect if the device 102 is approaching an area with no network coverage, such as only GPS coverage. If the out-of-coverage detection block 256 detects an approaching area with no server coverage, such as access to GPS coverage with the communication path 104, the detect client type block 258 can determine the size of the memory 118. For example, the detect client type block 258 can inform the adaptive navigation information engine 228 which type of navigation information to compile.

For example, using the detect client type block 258, the adaptive navigation information engine 228 can tailor the information within the sub-optimal navigation data 250 and the hybrid data 252 that is used or stored in the memory 118. The out-of-coverage detection block 256 can automatically request the sub-optimal navigation block 240 to send the sub-optimal navigation data 250 to the adaptive history cache block 232 or the memory 118. If the device 102 loses network coverage, the device 102 can access the information stored in the adaptive history cache block 232 and continue uninterrupted navigation service to the destination. The selection for the type of data can be determined by the performance capability of the control unit 106.

From the detect client type block 258, the intermittent coverage block 260 can be enabled if the intermittent coverage block 260 detects an unstable connection between the device 102 and the communication path 104. If the navigation system 100 is abruptly disconnected and reconnected to the network, such as reconnected to the communication path 104 with server and GPS access, the intermittent coverage block 260 can begin to download the appropriate information. For example, the intermittent coverage block 260 can download the sub-optimal navigation data 250, the hybrid data 252, the multiple-route data 246, or the full-detailed data 244 when the device 102 reestablishes a connection to the communication path 104 for server and GPS access.

From the intermittent coverage block 260, the warning block 262 can display an alert about an unstable connection with the non-GPS portion of the communication path 104 on the multimedia display interface 124 of FIG. 1. The warning block 262 can prompt the driver to manually request the sub-optimal navigation data 250 as well as download the sub-optimal navigation data 250 as mentioned above.

Using the sub-optimal navigation data 250, the device 102 can continue navigating in the event that the device 102 loses coverage for a period. Changing weather conditions, such as a lighting storm, heavy cloud cover or any cause of a weak telecommunication signal could cause the unstable connection or an intermittent loss of service.

For example, if the navigation system 100 detects repeated intermittent disconnects between the device 102 and non-GPS access of the communication path 104, the navigation system 100 can prompt the driver to switch or automatically switch to the intermittent coverage block 260. The repeated intermittent disconnects can be at a predetermined or pre-selected time period or distance.

The intermittent coverage block 260 can automatically request the sub-optimal navigation block 240 to send the sub-optimal navigation data 250 to the adaptive history cache block 232 or the memory 118. If the device 102 loses network coverage, the device 102 can access the information stored in the adaptive history cache block 232 and continue uninterrupted navigation service to the destination.

For illustrative purposes, the navigation system 100 is shown with the out-of-coverage detection block 256 following the enable block 254, although it is understood that the navigation system 100 can have the blocks in different configuration. For example, the detect client type block 258 can follow the enable block 254 without traversing the out-of-coverage detection block 256.

As another example, the out-of-coverage detection block 256 and the intermittent coverage block 260 can both follow the detect client type block 258. Both the out-of-coverage detection block 256 and the intermittent coverage block 260 can lead to the warning block 262.

It has been discovered that the present invention provides a navigation system having adaptive coverage for navigating in a no service or outage region by detecting predetermined criteria and adjusting functionality based on the detection of the predetermined criteria. For example, the predetermined criteria can include upcoming no service or outage region, other than GPS service for example, in a client route and the client capability. The no service or outage region can be a continuous geographic region where access to the non-GPS portion of the communication path is not available.

It has also been discovered that the present invention provides a navigation system having adaptive coverage for navigating in no service or outage region where the outage region can be determined by times, location, distance when access to the server through the communication path is intermittently unavailable. For example, the intermittent loss of server coverage can be based on weather conditions, such as thunderstorms or solar flares.

It has been further discovered that the present invention provides a navigation system having adaptive coverage for adjusting the amount and details of relevant information to be stored on the client based on the client capability. For example, the available memory size or performance of the control unit in the client can determine the amount of information stored in the client to be used in the outage situation. The navigation system can also provide a warning of the predetermined criteria detection allowing a user of the client to manually store the relevant information. The navigation system includes a wake up or resume functionality when the client receives service.

The warning block 262 can prompt the driver of an upcoming coverage change and can ask the driver to take actions with the navigation system 100. The warning block 262 can be enabled by the out-of-coverage detection block 256, the intermittent coverage block 260, and a resume coverage block 268.

In the first example, the warning block 262 can display a message on the device 102 that the driver is approaching an area with no network coverage. In this example, the warning block 262 can also automatically request from the multiple-route block 238 routing instructions to avoid the region with no network coverage, if possible.

In the second example, the warning block 262 can display a message on the device 102 that the intermittent coverage block 260 is enabled. In both the first example and the second example, the warning block 262 can prompt the driver to download the sub-optimal navigation data 250 in the event that the device 102 loses network coverage.

In the third example, the resume coverage block 268 can enable the warning block 262. The resume coverage block 268 will be discussed in detail below. The warning block 262 can prompt the driver that the access or coverage to the server through the communication path 104 is available.

From the warning block 262, the manual request block 264 can allow the driver to request specific information from the adaptive navigation information engine 228. For example, the driver can make specific requests from the full-detailed navigation block 236, the multiple-route block 238, the sub-optimal navigation block 240, and the hybrid navigation block 242. The driver can request specific POIs, restaurants for any geographic region, and maps. The information requested by the manual request block 264 can be stored in the memory 118.

From the manual request block 264, the manual input block 266 can allow the driver to create the user generated content 272. The user generated content 272 can include input map corrections, input POIs, and input map notes. The user generated content 272 can be stored in the memory 118. For example, the manual input block 266 can allow the driver to input parking lots, alleys, and streets as the user generated content 272 that is not available from the full-detailed navigation block 236. The user generated content 272 can be stored on the memory 118. This data can be later verified and made available to all other drivers to download to their devices.

The adaptive history cache block 232 can store the driver's turn-by-turn steps at certain pre-set intervals in the memory 118. For example, if the device 102 leaves a region with non-GPS service, the adaptive history cache block 232 can begin to store the driver's course.

The adaptive history cache block 232 can also store driver and navigation preferences, including, for example, the driver's commonly requested map regions, cities, POI, restaurants, and businesses. The adaptive history cache block 232 can be manually enabled or automatically enabled. The adaptive history cache block 232 can be coupled with the offline navigation block 234.

The offline navigation block 234 can include a reverse course block 270 and the resume coverage block 268. The reverse course block 270 can be coupled to the adaptive history cache block 232. The resume coverage block 268 can be coupled to the enable block 254. The driver can access the blocks in the offline navigation block 234 at any time, but these blocks are especially useful to a driver when the device 102 is offline from the non-GPS portion of the network.

The reverse course block 270 can provide the device 102 with reverse directions to navigate back to previously traversed locations. For example, the reverse course block 270 can provide directions to the last region with non-GPS service or any previous location stored in the memory 118. The reverse course block 270 can access the information stored by the adaptive history cache block 232 to reverse the turn-by-turn steps.

The resume coverage block 268 can detect that the device 102 returned to a coverage area with more than GPS service. The resume coverage block 268 can request the adaptive navigation information engine 228 to send or update the full-detailed data 244, the multiple-route data 246, the sub-optimal navigation data 250, the hybrid data 252, or a combination thereof from the communication path 104. The resume coverage block 268 can be coupled to the enable block 254.

The device 102 can resume the functions of the navigation operations block 230. From the enable block 254, the navigation system 100 can repeat or iterate the previous steps of the navigation operations block 230. The warning block 262 can display a resume coverage alert on the device 102.

Figure 3:
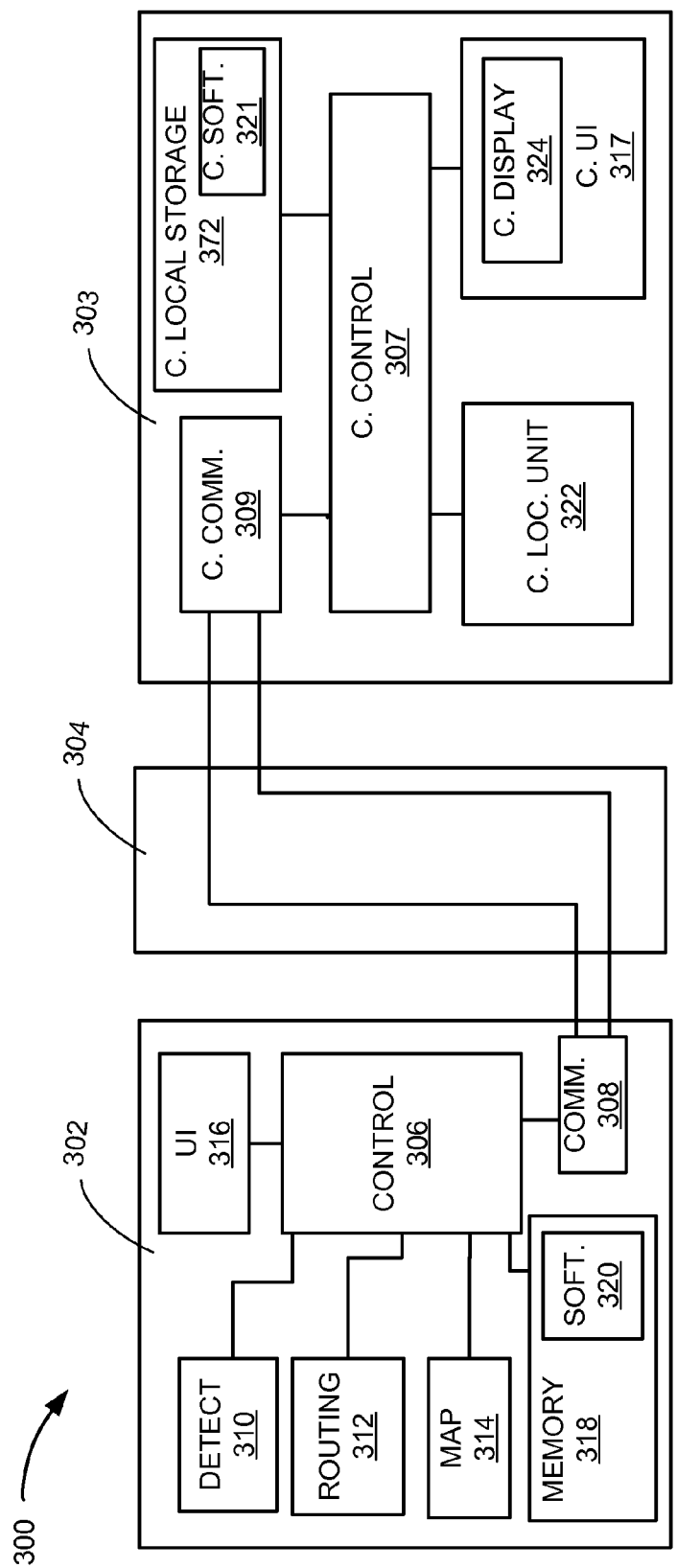
FIG. 3 is a block diagram of a navigation system having adaptive coverage in a second embodiment of the present invention.

Referring now to FIG. 3, therein is shown a block diagram of a navigation system 300 having adaptive coverage in a second embodiment of the present invention. A first device 302, such as a server or non-mobile computing device, can link to a second device 303, such as a client device or a mobile computing device, with a communication path 304.

The first device 302 can be any of a variety of centralized or decentralized computing devices. For example, the first device 302 can be a computer, a computer in a grid computing pool, a virtualized computer, a computer in a cloud computing pool, or a computer in a distributed computing topology. The first device 302 can include routing functions or switching functions for coupling with the communication path 304 to communicate with the second device 303.

The second device 303 can be of any of a variety of mobile devices. For example, the second device 303 can be a cellular phone, personal digital assistant, a notebook computer, or other multi-functional mobile communication or entertainment devices having means for coupling to the communication path 304.

The communication path 304 can be a variety of networks. For example, the communication path 304 can include wireless communication, wired communication, optical, ultrasonic, or the combination thereof. Satellite communication, cellular communication, Bluetooth, Infra-red Data Association standard (IrDA), wireless fidelity (WiFi), and worldwide interoperability for microwave access (WiMAX) are examples of wireless communication that can be included in the communication path 304. Ethernet, digital subscriber line (DSL), fiber to the home (FTTH), and plain old telephone service (POTS) are examples of wired communication that can be included in the communication path 304.

Further, the communication path 304 can traverse a number of network topologies and distances. For example, the communication path 304 can include personal area network (PAN), local area network (LAN), metropolitan area network (MAN), and wide area network (WAN).

For illustrative purposes, the first device 302 is shown in a single location, although it is understood that the server can be centralized or decentralized and located at different locations. For example, the first device 302 can represent real or virtual servers in a single computer room, distributed across different rooms, distributed across different geographical locations, embedded within a telecommunications network, virtualized servers within one or more other computer systems including grid or cloud type computing resources, or in a high powered client device. For convenience to describe an example of the present invention, the first device 302 will be described as a server.

Further, for illustrative purposes, the navigation system 300 is shown with the second device 303 as a mobile computing device, although it is understood that the second device 303 can be different types of computing devices. For example, the second device 303 can be a mobile computing device, such as notebook computer, another client device, or a different type of client device. For convenience to describe an example of the present invention, the second device 303 will be described as a client.

Yet further for illustrative purposes, the navigation system 300 is shown with the first device 302 and the second device 303 as end points of the communication path 304, although it is understood that the navigation system 300 can have a different partition between the first device 302, the second device 303, and the communication path 304. For example, the first device 302, the second device 303, or a combination thereof can also function as part of the communication path 304.

The first device 302 can include a server control unit 306, such as a processor or a computer, a server communication unit 308, a detect-type engine 310, a routing engine 312, a mapping engine 314, a user interface 316, and a memory 318. The memory 318 can include a first software 320. The server control unit 306 can be coupled to the server communication unit 308, the detect-type engine 310, the routing engine 312, the mapping engine 314, the user interface 316, and the memory 318.

For illustrative purposes, the navigation system 300 is shown with the first device 302 described with discrete functional blocks, although it is understood that the navigation system 300 can have the first device 302 in a different configuration. For example, the server control unit 306, the server communication unit 308, the detect-type engine 310, the routing engine 312, and the mapping engine 314 may not be discrete but may have one or more of the aforementioned blocks combined into one functional block.

The server control unit 306 can execute the first software 320 and can provide the intelligence of the first device 302 for interaction with the second device 303. The server control unit 306 can interact with the detect-type engine 310, the routing engine 312, the mapping engine 314, the communication path 304 via the server communication unit 308, and the user interface 316. The server communication unit 308 can send and receive information through the communication path 304.

The detect-type engine 310 can detect the functional capabilities and the storage capacity of the second device 303. The routing engine 312 can compute routing instructions to a location. The mapping engine 314 can provide map and graphical display information for a location. A user can provide an input to the first device 302 through the user interface 316.

The second device 303 can include, for example, a client control unit 307, such as a processor, coupled with a client local storage 372, a client software 321, a client communication unit 309, a client location unit 322, and a client user interface 317 having a multimedia display interface 324. The client user interface 317 can also include a projector, a key pad, a touchpad, soft-keys, a keyboard, a microphone, a speaker, or any combination thereof to provide data and command inputs to the second device 303.

The client control unit 307 can execute the client software 321 from the client local storage 372. The client control unit 307 can provide the intelligence of the second device 303 for interaction with the first device 302. The client software 321 can allow the second device 303 to interact with the communication path 304 via the client communication unit 309 and with the client location unit 322.

The client location unit 322 can provide location information and be implemented in many ways. For example, the client location unit 322 can be a global positioning system (GPS), inertial navigation system, cell-tower location system, accelerometer location system, or any combination thereof. The client location unit 322 can include the active and passive components, such as microelectronics or an antenna, for interaction with the communication path 304.

The client local storage 372 can store the client software 321, setup data, multimedia data, photos, text, sounds recordings, video, and other data for the operation of the second device 303 as a navigation device. The client local storage 372 can also store the relevant information, such as maps, sub-optimal maps, route information, sub-optimal route information, traffic information, advertisement and point of interest (POI), navigation routing entries, driver profiles, or any combination thereof, from the first device 302 or can be preloaded. The client local storage 372 can also store recorded, imaged, sampled or created relevant information to be transmitted to the first device 302.

The client local storage 372 can be implemented in a number of ways. For example, the client local storage 372 can be a nonvolatile storage such as non-volatile random access memory (NVRAM), Flash memory, or disk storage or a volatile storage such as static random access memory (SRAM).

The client communication unit 309 can connect to the server communication unit 308 through the communication path 304. The client communication unit 309 can include active and passive components, such as microelectronics or an antenna, for interaction to the telecommunication system of the communication path 304.

Figure 4:
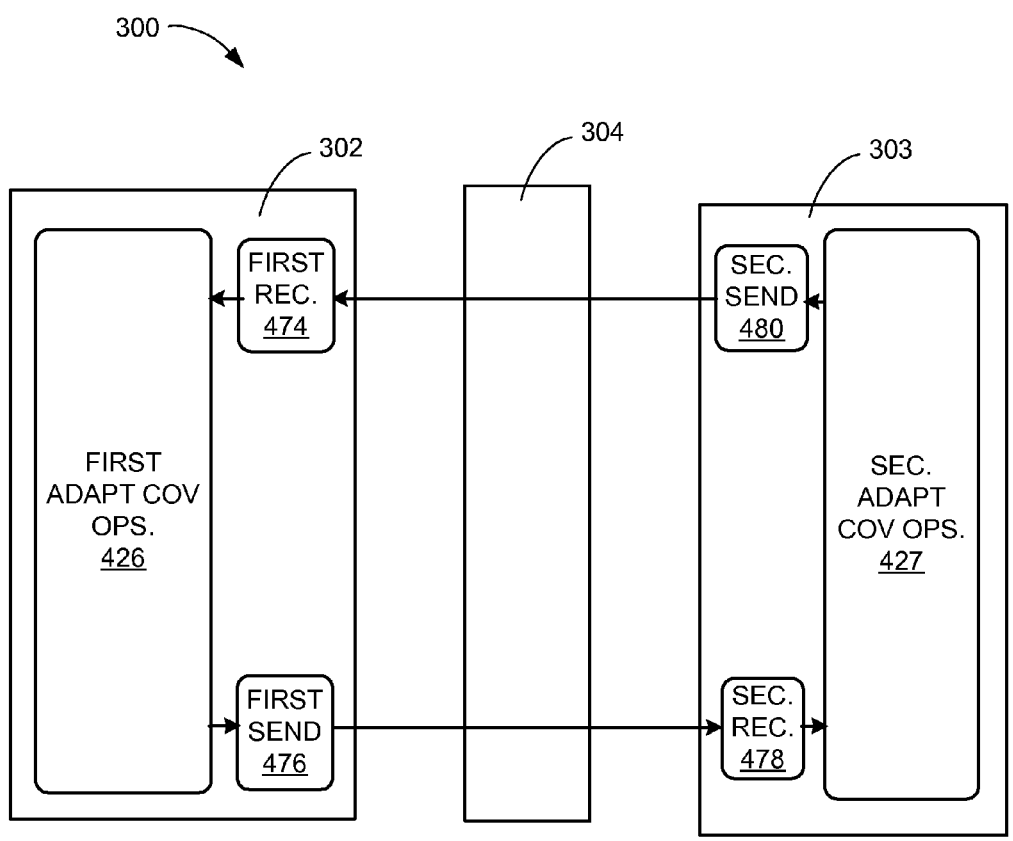
FIG. 4 is a flow chart of operation of the navigation system of FIG. 3.

Referring now to FIG. 4, therein is shown a flow chart of operation of the navigation system 300 of FIG. 3. The flow chart for the navigation system 300 can be partitioned between the first device 302 and the second device 303, as an example.

The first device 302 can include a first receive block 474, a first adaptive coverage operations block 426 and a first send block 476. The first adaptive coverage operations block 426 can be included in the first software 320 of FIG. 3. The server control unit 306 of FIG. 3 can execute the first software 320.

The second device 303 can include a second receive block 478, a second adaptive coverage operations block 427, and a second send block 480. The second adaptive coverage operations block 427 can be included in the client software 321 of FIG. 3. The client control unit 307 of FIG. 3 can execute the client software 321.

The first adaptive coverage operations block 426 can connect to the first send block 476. The first send block 476 can connect to the second receive block 478 through the communication path 304. The second receive block 478 can connect to the second adaptive coverage operations block 427. The second adaptive coverage operations block 427 can connect to the second send block 480. The second send block 480 can connect to the first receive block 474 through the communication path 304. The first receive block 474 can connect to the first adaptive coverage operations block 426.

Figure 5:
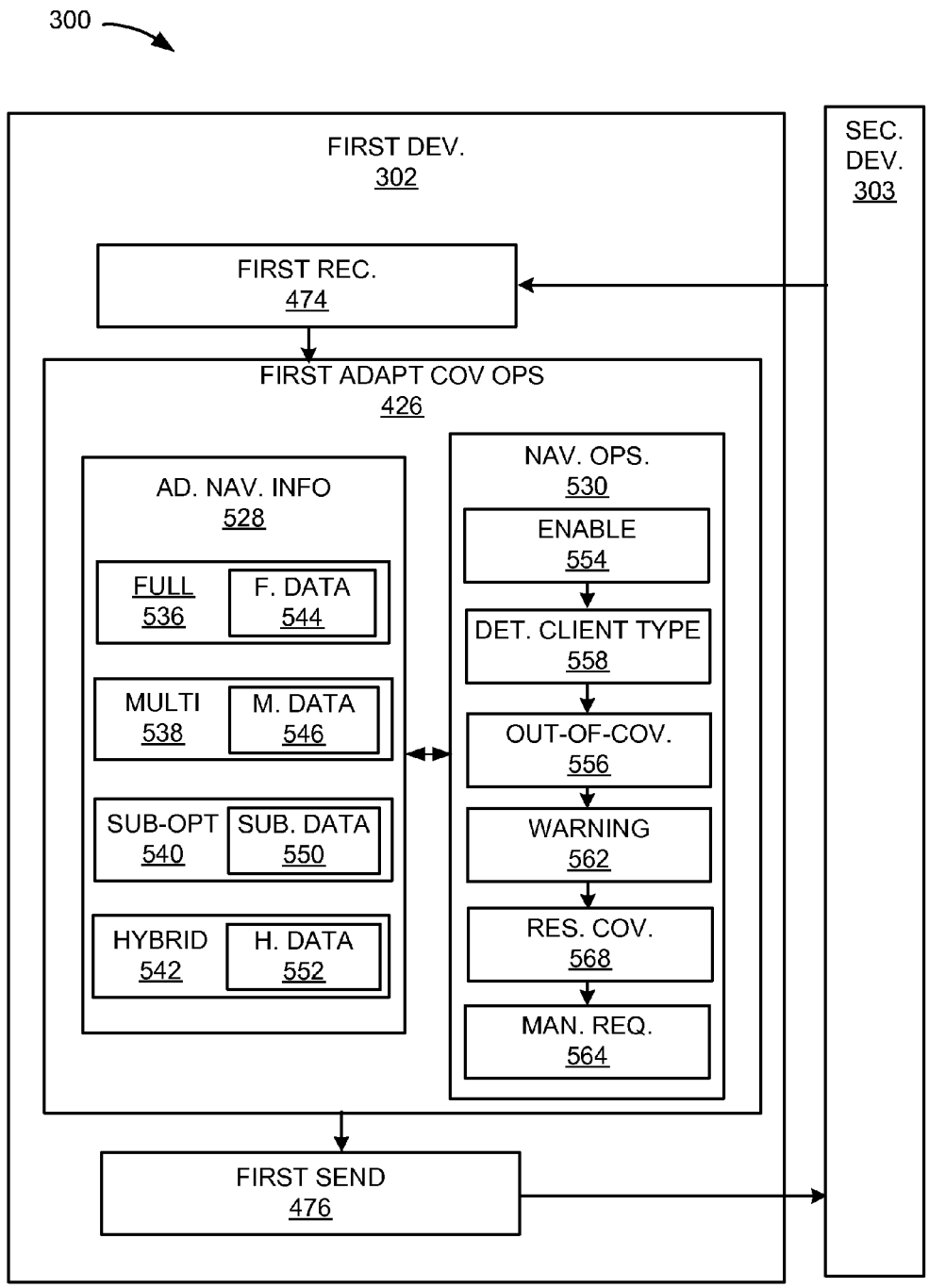
FIG. 5 is a more detailed flow chart of operation of the first device of the navigation system of FIG. 3.

Referring now to FIG. 5, therein is shown a more detailed flow chart of operation of the first device 302 of the navigation system 300 of FIG. 3. The first adaptive coverage operations block 426 can include an adaptive navigation information block 528 and a navigation operations block 530. The navigation operations block 530 can be coupled to the adaptive navigation information block 528.

The adaptive navigation information block 528 can include a full-detailed navigation block 536, a multiple-route block 538, a sub-optimal navigation block 540, and a hybrid navigation block 542. For illustrative purposes, the navigation system 300 is shown with the adaptive navigation information block 528 having discrete blocks, although it is understood that the adaptive navigation information block 528 can be include other blocks or blocks in different configurations.

For example, the adaptive navigation information block 528 can include the full-detailed navigation block 536, the multiple-route block 538, the sub-optimal navigation block 540, and the hybrid navigation block 542 in a different arrangement. The full-detailed navigation block 536, the multiple-route block 538, the sub-optimal navigation block 540, and the hybrid navigation block 542 can utilize the same or portion of the same information, can be organized into a single block, can be partitioned to smaller granularities, can be interconnected, or a combination thereof.

The full-detailed navigation block 536 can include full maps with full detailed relevant information including points of interests, landmarks, restaurants, gas stations, advertisements, coupons, and shopping centers. The full-detailed navigation block 536 can create full-detailed routing instructions including the data for audio prompts and turn-by-turn graphical instructions. The full-detailed navigation block 536 can compile the full-detailed navigation information into a full-detailed data 544. The full-detailed data 544 can be sent to the navigation operations block 530.

The multiple-route block 538 of the adaptive navigation information block 528 can calculate multiple routes based on the route for the second device 303. The multiple-route block 538 can include routes that take the shortest route, avoid freeways, avoid local routes, and create routes that take in account detours entered from the second device 303. The multiple-route block 538 can compile the multiple-route information into a multiple-route data 546. The multiple-route data 546 can be sent to the navigation operations block 530.

The sub-optimal navigation block 540 can generate a sub-optimal navigation data 550. The sub-optimal navigation data 550 can include non-full detailed versions of the information available from the full-detailed navigation block 536.

The sub-optimal navigation data 550 can be optimized to include selected maps and selected routing instructions for the available or allocated space in the client local storage 372 of FIG. 3 of the second device 303. The sub-optimal navigation block 540 can adapt the type and complexity of the sub-optimal navigation data 550. The sub-optimal navigation data 550 can be sent to the navigation operations block 530.

For example, the sub-optimal navigation block 540 can create low memory sub-optimal maps, sub-optimal routing instructions or a combination thereof. The sub-optimal maps can include basic maps of major freeways and city locations. The sub-optimal routing instructions can include turn-by-turn routing instructions in text format.

The hybrid navigation block 542 can create a hybrid data 552 including hybrid maps, hybrid routing instructions, or any combination thereof using information from the full-detailed navigation block 536 and the sub-optimal navigation block 540. A hybrid map, for example, can include full-details of a region of a city with less detailed map information surrounding the full-detailed area. As a different example, the hybrid navigation block 542 can contain a portion or all of the hybrid data 552 as preprocessed data.

Hybrid routing instructions can include some audio route instructions and more detailed text instructions or any combination of the two. The detail within the hybrid maps and the hybrid routing instructions can be adapted to limitations of the client local storage 372. Full-detailed and non-full detailed information in the hybrid maps and the hybrid routing instructions can be selectable, set automatically, or manually selected. The hybrid data 552 can be sent to the navigation operations block 530.

The navigation operations block 530 can include an enable block 554, a detect client type block 558, an out-of-coverage detection block 556, a warning block 562, a resume coverage block 568, and a manual request block 564. For illustrative purposes, the navigation system 300 is shown with the navigation operations block 530 having discrete blocks, although it is understood that the navigation system 300 can include the navigation operations block 530 with different partition of blocks and in a different arrangement.

For example, the enable block 554, the detect client type block 558, the out-of-coverage detection block 556, the warning block 562, the resume coverage block 568, and the manual request block 564 can be included into overlapping blocks or in the same block. As another example, the enable block 554, the detect client type block 558, the out-of-coverage detection block 556, the warning block 562, the resume coverage block 568, and the manual request block 564 can be interconnected.

The enable block 554 of the navigation operations block 530 can determine the features available to or within the second device 303 and can enable a predetermined set of the features. For example, the second device 303 can be enabled based on the terms in the service agreement or the capability of the second device 303.

The detect client type block 558 can determine the type and size of the client local storage 372 of FIG. 3 of the second device 303. For example, the detect client type block 558 can inform the adaptive navigation information block 528 which type of navigation information to compile and send to the second device 303.

For example, the adaptive navigation information block 528 can tailor the information for the client local storage 372 with the sub-optimal navigation data 550 or the hybrid data 552. As a different example, the adaptive navigation information block 528 can tailor the information for the client local storage 372 with the full-detailed data 544 or the multiple-route data 546.

The out-of-coverage detection block 556 can detect if the second device 303 is approaching an area with no network coverage or no access to the first device 302. The out-of-coverage detection block 556 can enable the warning block 562.

The warning block 562 can send a warning message to the second device 303 when the second device 303 is approaching an area with no network coverage preventing communication between the first device 302 and the second device 303. The warning block 562 can also interact with the multiple-route block 538 to generate routing instructions for the second device 303 to avoid a region with no network coverage, if possible.

The resume coverage block 568 can detect that the second device 303 has returned to a coverage area where the first device 302 can communicate with the second device 303. The resume coverage block 568 then can inform the adaptive navigation information block 528 to resume sending the full-detailed data 544 from the full-detailed navigation block 536 or the appropriate data based on the output of the detect client type block 558.

The manual request block 564 can allow the second device 303 to pull specific information from the adaptive navigation information block 528. For example, the second device 303 can make specific requests from the full-detailed navigation block 536, the multiple-route block 538, the sub-optimal navigation block 540, and the hybrid navigation block 542. The second device 303 can request specific POIs, hybrid maps, restaurants for any geographic region, and full city maps. The information requested by the manual request block 564 can be stored in the client local storage 372.

The navigation operations block 530 can receive information from the second device 303 with the first receive block 474. The first send block 476 can send information from the navigation operations block 530 to the second device 303.

Figure 6:
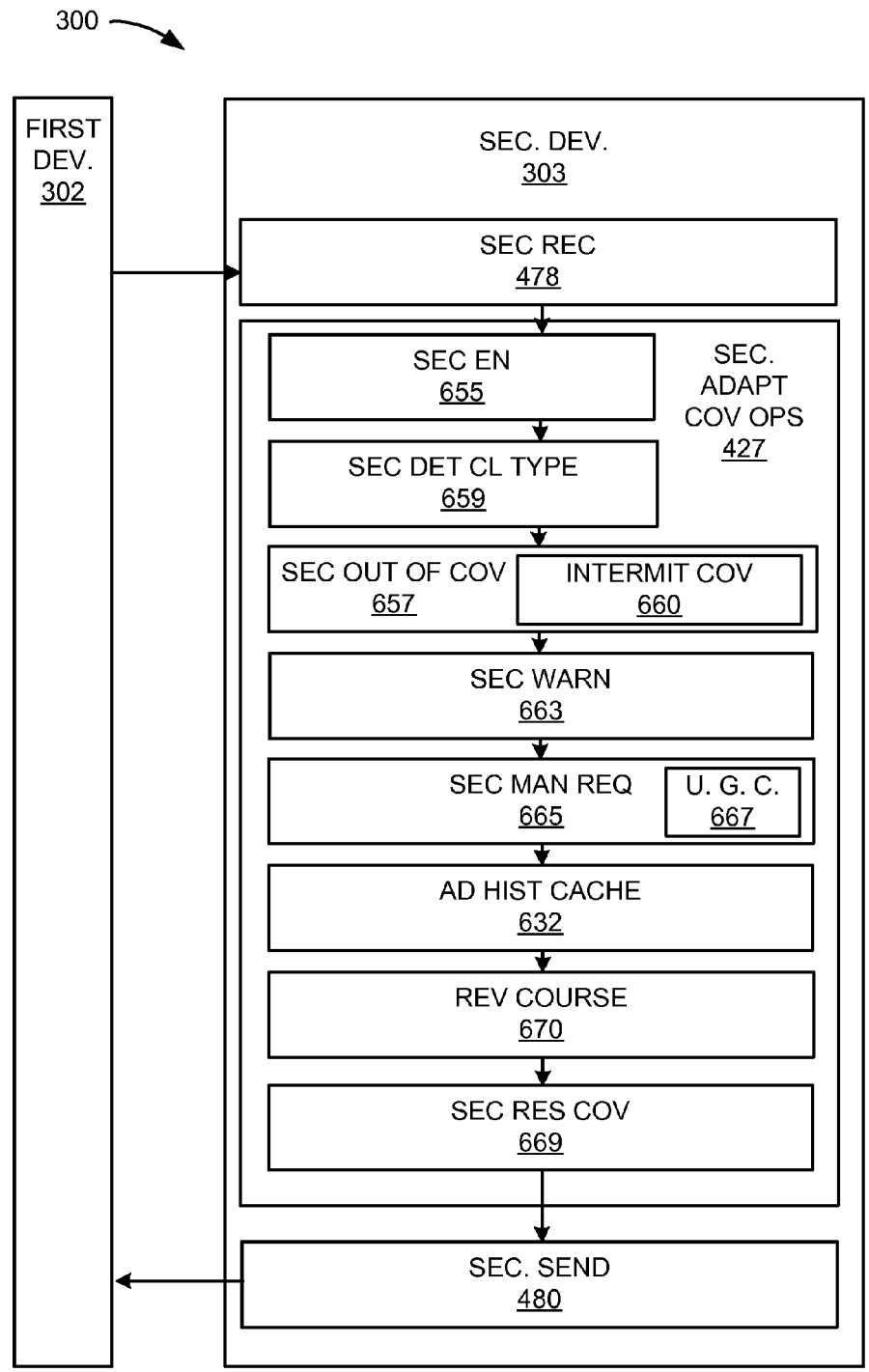
FIG. 6 is a more detailed flow chart of operation of the second device of the navigation system of FIG. 3.

Referring now to FIG. 6, therein shown is a more detailed flow chart of operation of the second device 303 of the navigation system 300 of FIG. 3. The second device 303 can include the second receive block 478, the second adaptive coverage operations block 427, and the second send block 480. The second receive block 478 can be linked to the second adaptive coverage operations block 427, which is linked to the second send block 480.

The second adaptive coverage operations block 427 can include a second enable block 655, a second detect client type block 659, a second out-of-coverage detection block 657, a second warning block 663, a second manual request block 665, an adaptive history cache block 632, a reverse course block 670, and a second resume coverage block 669. The second manual request block 665 can include a user generated content 667.

The second enable block 655 can determine the features available to or within the second device 303 and can enable a predetermined set of the features. This information can be sent through the communication path 304 of FIG. 3 to the enable block 554 of FIG. 5 of the first device 302. The second enable block 655 can enable the second detect client type block 659.

The second detect client type block 659 can determine the type, the size, and space availability of the client local storage 372 of FIG. 3 of the second device 303. The second detect client type block 659 can recognize the classification of the second device 303.

For example, the second detect client type block 659 can determine if the client control unit 307 of FIG. 3 of the second device 303 is a high end processor, as an example, or a low end processor. The second detect client type block 659 can send this information to the detect client type block 558 of FIG. 5 of the first device 302 through the communication path 304. The second adaptive coverage operations block 427 can progress from the second detect client type block 659 to the second out-of-coverage detection block 657.

The second out-of-coverage detection block 657 can detect the access or lack of access to the first device 302 by the second device 303. For example, the second out-of-coverage detection block 657 can display if the second device 303 is connected to the communication path 304 through a blue-tooth connection, a WiFi connection, or a cellular connection in the communication path 304.

The second out-of-coverage detection block 657 can include an intermittent coverage block 660. The intermittent coverage block 660 can function similarly to the intermittent coverage block 260 of FIG. 2 of the first device 302. For example, the second out-of-coverage detection block 657 can detect an unstable connection with the first device 302 over the communication path 304. The second out-of-coverage detection block 657 can enable the intermittent coverage block 660. An unstable connection is defined as multiple disconnects between the first device 302 and the second device 303 within a predetermined period of time or distance, the second out-of-coverage detection block 657 can enable the intermittent coverage block 660.

If the intermittent coverage block 660 can establish a connection with the first device 302, the second device 303 can download the sub-optimal navigation data 550 of FIG. 5. Using the sub-optimal navigation data 550, the second device 303 can continue navigating in the event that the second device 303 loses coverage. The second out-of-coverage detection block 657 can be coupled with the second warning block 663.

The second warning block 663, as an example, can receive and display an alert message from the warning block 562 of FIG. 5 of the first device 302. The second warning block 663 can also be enabled by the intermittent coverage block 660.

The alert message provides an indication that the second device 303 is approaching an area with no access to the first device 302. The lack of access can be continuous no access region or an intermittent access region. If an avoidance route is possible, the second warning block 663 can also display routing instructions to avoid an area with no access to the first device 302. The second warning block 663 can be coupled with the second manual request block 665.

The second manual request block 665 can allow the second device 303 to request specific data from the adaptive navigation information block 528 of FIG. 5 of the first device 302. For example, the user can request the sub-optimal navigation data 550 for specific POIs or restaurants for storing in the client local storage 372 of the second device 303. The second manual request block 665 can be coupled with the adaptive history cache block 632.

The second manual request block 665 can allow the driver to create the user generated content 667. The user generated content 667 can include input map corrections, input POIs, and input map notes. The user generated content 667 can be stored into the second device 303 in the client local memory 372. For example, the user generated content 667 can also include inputted information such as parking lots, alleys, and streets that are not available from the full-detailed navigation block 536 of FIG. 5. The user generated content 667 can be stored on the client local storage 372 and can also be sent to the first device 302. The user generated content 667 can be verified and made available in the full-detailed navigation block 536.

As an example, the second out-of-coverage detection block 657 can detect that the second device 303 is or is not connected to the first device 302. Within a service region to the first device 302, the second device 303 can display warnings or alerts from the second warning block 663 and the driver can take an appropriate action. To react to the alert, the driver can also use the second manual request block 665 to request specific information from the adaptive navigation information block 528 of FIG. 5.

The second out-of-coverage detection block 657 can also detect if the second device 303 is not connected to the first device 302. If the driver elects, the driver can use the second manual request block 665 to retrieve navigation data, such as the user generated content 667, that is stored in the client local storage 372 of the second device 303. In this situation, the reverse course block 670 and the adaptive history cache block 632 can be used with the user generated content 667 from the client local storage 372 to backtrack and navigate to an area with service.

For illustrative purposes, the navigation system 300 is shown with the second adaptive coverage operations block 427 having discrete blocks, although it is understood that the navigation system 300 can have a different partition of blocks or different blocks. For example, the second enable block 655, the second detect client type block 659, the second out-of-coverage detection block 657, the second warning block 663, the second manual request block 665, the adaptive history cache block 632, the reverse course block 670, and the second resume coverage block 669 can be connected differently or partitioned that some or portions of these blocks can be combined or partitioned separately.

The adaptive history cache block 632 can store the driver's turn-by-turn steps at certain pre-set intervals in the client local storage 372. For example, if the second device 303 leaves a region with access to the first device 302, the adaptive history cache block 632 can store the driver's course.

The adaptive history cache block 632 can also store driver and navigation preferences, including the driver's commonly requested map regions, cities, POI, restaurants, and businesses. The adaptive history cache block 632 can be manually enabled or automatically enabled. The adaptive history cache block 632 can be coupled with the reverse course block 670.

The reverse course block 670 can provide the second device 303 with reverse directions to navigate back to previously traversed locations. For example, the reverse course block 670 can provide directions to the last region with access to the first device 302 or any previous location stored in the client local storage 372 of FIG. 5 of the second device 303.

The reverse course block 670 can access the information stored by the adaptive history cache block 632. The reverse course block 670 can reverse the turn-by-turn steps stored in the adaptive history cache block 632. The adaptive history cache block 632 can be stored in the client local storage 372. The reverse course block 670 can be coupled with the second resume coverage block 669.

The second resume coverage block 669 can detect resumption of the communication access between the first device 302 and the second device 303. The second resume coverage block 669 can resume information transfer between the first device 302 and the second device 303. The second device 303 can also operate the second resume coverage block 669 when the second device 303 is first powered on.

Figure 7:
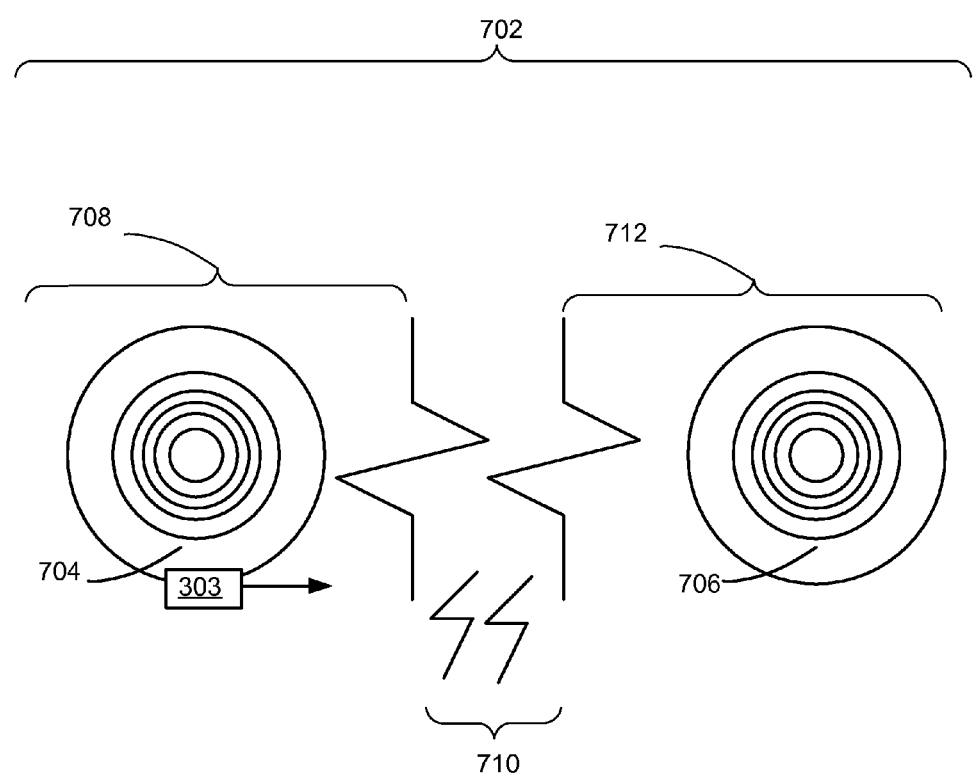
FIG. 7 is a diagrammatical view of geographic regions having service and no service in an example application of the navigation system of FIG. 3.

Referring now to FIG. 7, therein is shown a diagrammatical view of geographic regions having service and no service in an example application of the navigation system 300 of FIG. 3. A no service region is defined as a geographic region where the second device 303 cannot access the first device 302 of FIG. 3 over the communication path 304 of FIG. 3. A service region is defined as a geographic region where the second device 303 can access the first device 302 over the communication path 304.

The diagrammatic view depicts an example of the second device 303 traveling from left to right of a geographic region in a route 702 including first concentric circles 704 and second concentric circles 706 representing service signals. For illustrative purposes, the second device 303 can represent a vehicle or a pedestrian to illustrate the operation of the navigation system 300.

As an example, the second device 303 travels from a first service region 708, including the first concentric circles 704, then traverses a no service region 710 and enters a second service region 712. For example, the geographic regions from the first service region 708 to the second service region 712 may represent local and geographically adjacent regions or may be separated by large distances, such as from west coast to the east coast of the United States of America.

As another example, the route 702 can represent a person with the second device 303 walking along a path or a surveyor with the second device 303 can encounter the first service region 708 and the no service region 710. The no service region 710 may be a geographic region with no access to the first device 302, may be a period when and where the first device 302 is non-operative. The no service region 710 may be an intermittent loss of service region 710, which is a geographic region where access to the first device 302 is unstable or intermittent, such that multiple disconnects between the first device 302 and the second device 303 occur within a predetermined period or distance. For example, the no service region 710 also includes lightning bolts that represent disruptive weather conditions that may cause the unstable or intermittent service.

When the second device 303 is in a region with service, for example the first service region 708 or the second service region 712, the second device 303 can have access to the full-detailed navigation block 536 of FIG. 5, the multiple-route block 538 of FIG. 5, the sub-optimal navigation block 540 of FIG. 5 and the hybrid navigation block 542 of FIG. 5 within the adaptive navigation information block 528 of FIG. 5. In addition, when the second device 303 is in the first service region 708, the second device 303 can use the second manual request block 665 of FIG. 6 to request specific data from the full-detailed navigation block 536, the multiple-route block 538, the sub-optimal navigation block 540, and the hybrid navigation block 542.

When the second device 303 approaches the no service region 710, the warning block 562 of FIG. 5 can send an alert message to the second device 303 approaching the no service region 710. The second device 303 can then display a prompt, provide an audio warning, or a combination thereof for the driver to take a course of action based on the alert message. The warning block 562 can provide the second device 303 with route instructions to avoid the no service region 710, if such a course is available from the multiple-route block 538.

Before the second device 303 enters the no service region 710, the driver can manually enable the second device 303 to start downloading the full-detailed data 544 of FIG. 5, the multiple-route data 546 of FIG. 5, the sub-optimal navigation data 550 of FIG. 5, or the hybrid data 552 of FIG. 5 or can allow the navigation system 100 to automatically download to the second device 303. The downloaded data can assist the driver in completing the trip with or without the availability of service or in the no service region 710.

If the second device 303 reenters a service zone, for example, the second service region 712, the navigation system 300 can enable the resume coverage block 568 of FIG. 5 and the first device 302 can resume transferring information with the second device 303.

The second device 303 can also operate the intermittent coverage block 660 of FIG. 6 when the second device 303 enters into the no service region 710. The intermittent coverage block 660 can be enabled when the first device 302 detects an unstable connection with the second device 303. Changing weather conditions, such as a lighting storm, could cause the unstable connection or an intermittent loss of service for the no service region 710.

For example, if the navigation system 300 detects repeated intermittent disconnects between the second device 303 and the first device 302 in a predetermined or pre-selected time period or distance, the navigation system 300 can prompt the driver to switch or automatically switch to the intermittent coverage block 660. With the intermittent coverage block 660, the navigation system 300 can perform in the same way as if the second device 303 was preparing to enter a region without service, such as the no service region 710.

The second device 303 can immediately download the sub-optimal navigation data 550 to continue navigating. The second device 303 can continue to navigate in the no service region 710 having intermittent service with the information stored in the client local storage 372 of FIG. 3.

Figure 8:
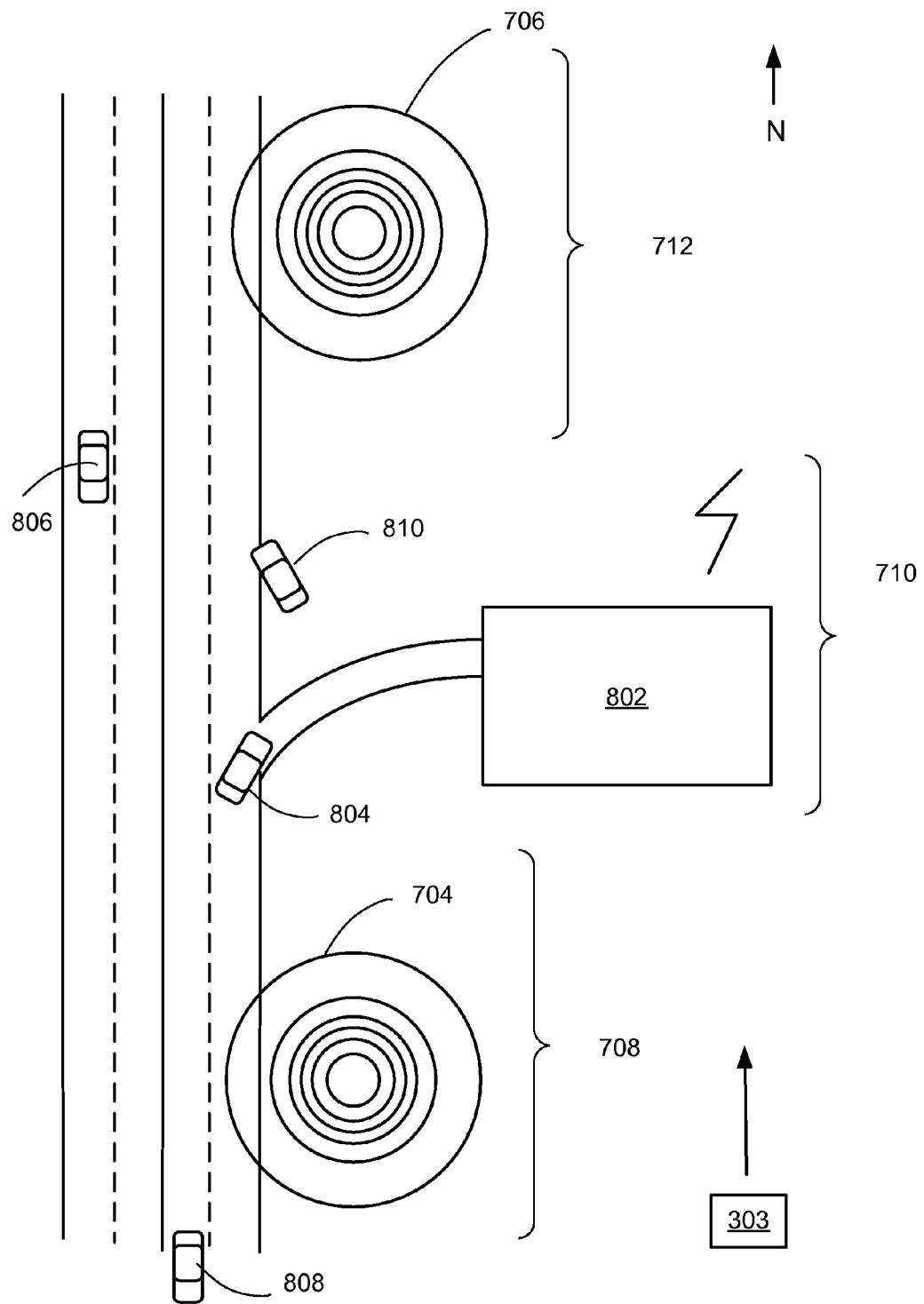
FIG. 8 is a geographic model to exemplify multiple examples for the operation of the navigation system of FIG. 3.

Referring now to FIG. 8, therein is illustrated a geographic model to exemplify multiple examples for the operation of the navigation system 300 of FIG. 3. The geographic model depicts an example of the second device 303 traveling from south to north of the geographic region with the first concentric circles 704 and the second concentric circles 706 representing service.

The second device 303 travels from the first service region 708 to the no service region 710 and enters the second service region 712. For example, the geographic model also depicts a local street and a city 802. The multiple examples are illustrative examples for the operation of the navigation system 300 and are not an exhaustive representation of examples.

In a first example at a first location 804, a driver having the second device 303 can decide to take a detour to the city 802 that is in the no service region 710. Before leaving the first service region 708, the driver can use the second manual request block 665 of FIG. 6 to manually request the full map of the city 802 from the full-detailed navigation block 536 of FIG. 5 and can store that map to the client local storage 372 of FIG. 3.

After receiving the alert from the second warning block 663 of FIG. 7, the driver can manually enable or automatically allow the second device 303 to start downloading the sub-optimal navigation data 550 of FIG. 5 from the sub-optimal navigation block 540 of FIG. 5. The second device 303 can use the sub-optimal navigation data 550 to assist in traveling to the city 802.

Once inside the city 802, the driver can use the stored full map of the city 802 to navigate within the city 802. Once the driver has concluded the detour through the city 802, the driver can use the sub-optimal navigation data 550 already stored on the second device 303 to return to his original end destination. The driver can also enable the reverse course block 670 of FIG. 6 to retrace his steps and return to the original area where the driver first left the first service region 708.

In a second example at a second location 806, the second device 303 maintains a connection with the first device 302 of FIG. 3 for the entirety of the trip as the driver does not travel outside a region with service. In this example, the first device 302 can continuously send data from the full-detailed navigation block 536 and the multiple-route block 538 of FIG. 5 to the second device 303.

In a third example at a third location 808, the second device 303 has access to the first device 302 prior to the trip but no connection for the duration of the trip. Prior to the trip, the driver can manually download the sub-optimal navigation data 550, the multiple-route data 546 of FIG. 5, or the hybrid data 552 of FIG. 5. The driver can request specific information using the second manual request block 665 of FIG. 6 to request the sub-optimal navigation data 550, the multiple-route data 546, or the hybrid data 552. This information can be stored on the client local storage 372. After embarking on the trip, the second device 303 can use the sub-optimal navigation data 550, the multiple-route data 546, or the hybrid data 552 to navigate the trip.

In a fourth example at a fourth location 810, the driver decides to take a detour but soon changes his mind. The driver has briefly left the first service region 708. The driver can then enable the reverse course block 670 of FIG. 6. The reverse course block 670 can reverse the steps that the driver took from steps recorded in the adaptive history cache block 632 of FIG. 6. The driver can retrace his steps and return to any previous location stored on the client local storage 372 of the second device 303.

Figure 9:
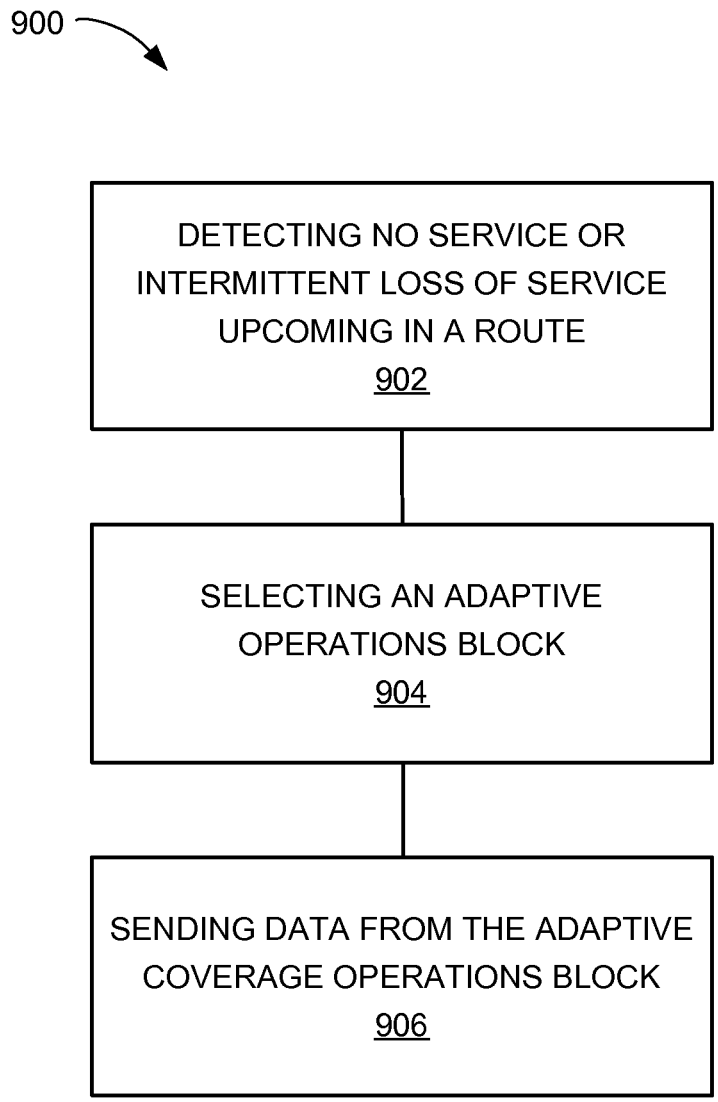
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes detecting a no service region or an intermittent loss of service region upcoming in a route in a block 902; selecting an adaptive coverage operations block based on the no service region or based on the intermittent loss of service region for storing on a device in a block 904; and sending data from the adaptive coverage operations block for displaying on the device in a block 906.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system having adaptive coverage comprising:
dynamically detecting an intermittent loss of service region based on detecting a reconnect for communication followed by a disconnect within a threshold time period for communicating between devices over a network;
selecting an adaptive coverage operations block based on detecting the intermittent loss of service region for storing on a device; and
sending data from the adaptive coverage operations block for guiding a user along a route through the intermittent loss of service region and displaying on the device.

2. The method as claimed in claim 1 wherein sending data from the adaptive coverage operations block includes sending full-detailed data, suboptimal navigation data, multiple-route data, hybrid data, or a combination thereof.

3. The method as claimed in claim 1 wherein sending data from the adaptive coverage operations block for displaying on the device includes sending full-detailed data, sub-optimal navigation data, multiple-route data, hybrid data, or a combination thereof for operating the device.

4. The method as claimed in claim 1 further comprising detecting a functional capability of the device.

5. The method as claimed in claim 1 further comprising sending a warning from the adaptive coverage operations block of a no service region upcoming in the route for displaying on the device.

6. A method of operation of a navigation system having adaptive coverage comprising:
dynamically detecting an intermittent loss of service region based on detecting a reconnect for communication followed by a disconnect within a threshold time period for communicating between devices over a network;
selecting an adaptive coverage operations block including sub-optimal navigation data based on detecting the intermittent loss of service region for storing on a device;
sending data from the adaptive coverage operations block for guiding a user along a route through the intermittent loss of service region; and
sending a warning from the adaptive coverage operations block of the intermittent loss of service region upcoming in the route for displaying on the device.

7. The method as claimed in claim 6 wherein sending data from the adaptive coverage operations block for operating the device includes sending user generated content for navigating the device.

8. The method as claimed in claim 6 wherein sending data from the adaptive coverage operations block for operating the device includes operating a reverse course block to navigate back to a previously traversed location.

9. The method as claimed in claim 6 further comprising operating the device in a no service region including operating an adaptive history cache block to navigate to preferences.

10. The method as claimed in claim 6 further comprising adapting the data based on a space in a memory of the device.

11. A navigation system having adaptive coverage comprising:
a communication unit for dynamically detecting an intermittent loss of service region based on detecting a reconnect for communication followed by a disconnect within a threshold time period for communicating between devices over a network; and
a control unit, coupled to the communication unit, for:
selecting an adaptive coverage operations block including sub-optimal navigation data based on detecting the intermittent loss of service region for storing on a device, and
sending data from the adaptive coverage operations block with the communication unit for guiding a user along a route through the intermittent loss of service region and displaying on the device.

12. The system as claimed in claim 11 wherein the control unit is for sending full-detailed data, sub-optimal navigation data, multiple-route data, hybrid data, or a combination thereof.

13. The system as claimed in claim 11 wherein the communication unit is for sending full-detailed data, sub-optimal navigation data, multiple-route data, hybrid data, or a combination thereof for operating the device.

14. The system as claimed in claim 11 wherein the control unit is for detecting a functional capability of the device.

15. The system as claimed in claim 11 wherein the control unit is for sending a warning from the adaptive coverage operations block of a no service region upcoming in the route for displaying on the device.

16. The system as claimed in claim 11 wherein:
the control unit is for sending a warning from the adaptive coverage operations block of the intermittent loss of service region upcoming in the route for displaying on the device; and
the communication unit is for sending full-detailed data, sub-optimal navigation data, multiple-route data, hybrid data, or a combination thereof for operating the device.

17. The system as claimed in claim 16 wherein the communication unit is for sending user generated content for navigating the device.

18. The system as claimed in claim 16 wherein the communication unit is for sending the full-detailed data, the sub-optimal navigation data, the multiple-route data, the hybrid data, or a combination thereof for operating a reverse course block in the device operating to navigate back to a previously traversed location.

19. The system as claimed in claim 16 wherein the communication unit is for sending the full-detailed data, the sub-optimal navigation data, the multiple-route data, the hybrid data, or a combination thereof for operating an adaptive history cache block to navigate to preferences.

20. The system as claimed in claim 16 wherein the control unit is for adapting the data based on a space in a memory of the device.

* * * * *